(12) United States Patent
Totzke et al.

(10) Patent No.: US 10,250,661 B2
(45) Date of Patent: *Apr. 2, 2019

(54) METHOD OF CONTROLLING A REAL-TIME CONFERENCE SESSION

(71) Applicant: Unify Patente GmbH & Co. KG, Munich (DE)

(72) Inventors: Jurgen Totzke, Poing (DE); Vasileios Giatilis, Palaio Faliro (GR); Charidimos Tzedakis, Athens (GR); Kleoniki Markou, Athens (GR); Labros Pappas, Iraklio (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,192

(22) Filed: Jul. 9, 2018

(65) Prior Publication Data

US 2018/0316738 A1   Nov. 1, 2018

Related U.S. Application Data

(63) Continuation of application No. 15/422,629, filed on Feb. 2, 2017, now Pat. No. 10,044,783.

(30) Foreign Application Priority Data

Feb. 4, 2016   (EP) .................................... 16154347

(51) Int. Cl.
*H04L 29/06*   (2006.01)
*H04L 12/18*   (2006.01)
(Continued)

(52) U.S. Cl.
CPC ........ *H04L 65/602* (2013.01); *H04L 12/1831* (2013.01); *H04L 65/1023* (2013.01); (Continued)

(58) Field of Classification Search
CPC ............... H04L 65/602; H04L 12/1831; H04L 65/1023; H04L 65/403; H04L 65/4038; (Continued)

(56) References Cited

U.S. PATENT DOCUMENTS

| 8,681,203 B1 | 3/2014 | Yin et al. |
| 2008/0010347 A1 | 1/2008 | Houghton et al. |

(Continued)

FOREIGN PATENT DOCUMENTS

| EP | 2797316 A2 | 10/2014 |
| WO | 2015001492 A1 | 1/2015 |

*Primary Examiner* — Duc C Ho
(74) *Attorney, Agent, or Firm* — Buchanan Ingersoll & Rooney PC

(57) ABSTRACT

In a method of controlling a real-time conference session there is a first user and a second user connected to a media processing unit. The first user has a passive mode wherein data is received at and transmitted by the first users communication terminal as passive data but not received by the communication terminal of the second user and an active mode wherein the data received and transmitted by the first user's terminal and received by the second user's terminal as active data. When the first user switches from the passive mode to the active mode there is a duration of the conference call that is left to be transmitted to the second user. That portion has been recorded and is played at a faster rate to the second user.

20 Claims, 9 Drawing Sheets

(51) Int. Cl.
*H04M 3/56* (2006.01)
*H04N 7/15* (2006.01)
(52) U.S. Cl.
CPC ........ *H04L 65/1083* (2013.01); *H04L 65/403* (2013.01); *H04L 65/4038* (2013.01); *H04M 3/566* (2013.01); *H04M 3/567* (2013.01); *H04M 3/568* (2013.01); *H04M 3/569* (2013.01); *H04N 7/155* (2013.01); *H04M 2203/305* (2013.01)
(58) Field of Classification Search
CPC ...... H04M 3/566; H04M 3/567; H04M 3/568; H04M 3/569; H04N 7/155
See application file for complete search history.

(56) References Cited

U.S. PATENT DOCUMENTS

| | | |
|---|---|---|
| 2008/0137558 A1 | 6/2008 | Baird |
| 2010/0274796 A1* | 10/2010 | Beauregard ......... H04L 12/1822 707/769 |
| 2016/0055859 A1 | 2/2016 | Finlow-Bates et al. |
| 2016/0337510 A1* | 11/2016 | Li, I .................... H04M 3/2236 |
| 2017/0374118 A1 | 12/2017 | Pevzner |

\* cited by examiner

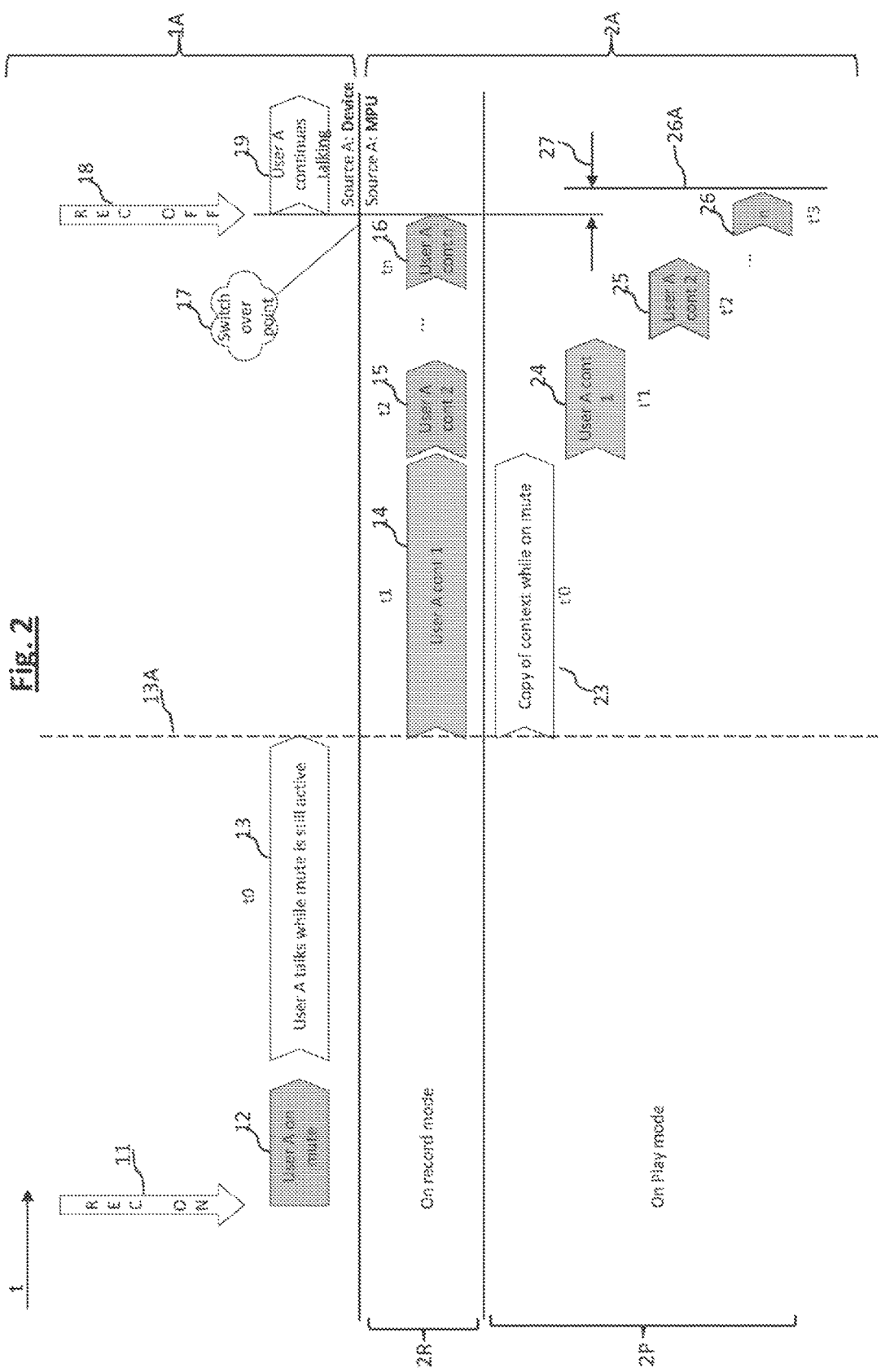

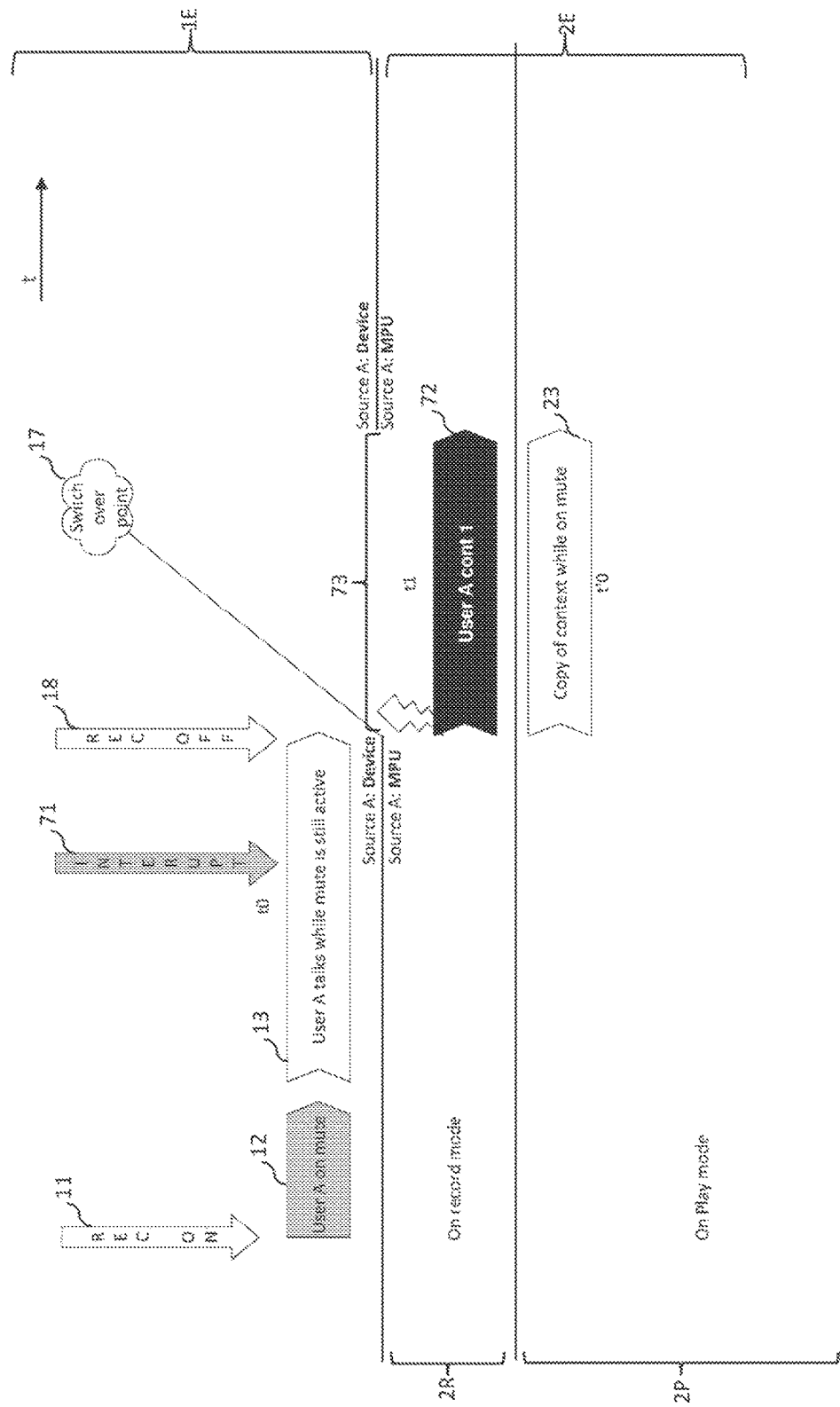

Media processing unit 2 allows a communication session to comprise a passive mode of the first user, wherein the data is received at and transmitted by the first communication terminal as passive data but not received by a second communication terminal, and an active mode of the first user, wherein the data is received and transmitted by the first communication terminal and received by the second communication terminal as active data.

↓

Switch from the passive mode to the active mode at a switching point-in-time. In some embodiments, the switching can occur in response to recognizing an indication for actuation of the switching (e.g. recognizing a gesture, the pressing of a button, etc.).

↓

Record a first duration of the passive data and a second duration of active data of the first user in which the second duration starts from the switching point-in-time and the first duration ends at the switching point-in-time or starts from the switching point-in-time. In some embodiments, the recording can occur to provide a hastened recording via dropping or skipping at least one of several speech samples and frames of the recorded first duration of the passive data and/or the recorded second duration of the active data.

↓

Replay the recorded first duration of the passive data and the recorded second duration of the active data to the second user via the second communication terminal after the switching (the replaying starts from the switching point-in-time). In some embodiments, the replaying can occur to provide a hastened replaying via dropping or skipping at least one of several speech samples and frames of the recorded first duration of the passive data and/or the recorded second duration of the active data.

↓

Switch off the recording and start to transmit the data of the first user in real-time to the second communication terminal of the second user upon a determination that a synchronization delay between a first end of the second duration of the active data of the first user during recording and a second end of the replayed second duration of the active data after recording is equal to or smaller than a predetermined duration.

FIG. 8

METHOD OF CONTROLLING A REAL-TIME CONFERENCE SESSION

CROSS REFERENCE TO RELATED APPLICATIONS

This application is a continuation of U.S. patent application Ser. No. 15/422,629, which claims priority to European Patent Application No. 16154347.5, filed on Feb. 4, 2016.

FIELD OF INVENTION

The invention relates to a method of controlling a real-time conference session. The invention further relates to a computer program product causing a computer to execute the method, and a communication system for controlling the real-time conference session.

BACKGROUND OF THE INVENTION

A modern conference session, also abbreviated as conference, can be established by a mixing unit in the form of a conference bridge or Media Streamer. The Media Streamer executes an application for controlling of a conference which can be defined as a program, in particular a computer program or application software that allows an administrator to control the conference. When the application for controlling a conference is running on a computer, the application is able to provide a mixture of speech signals from participants, also called users, of the conference. The application for controlling the conference can be installed on a personal computer, abbreviated to PC, and/or run on the PC. Such a PC is also referred to as the Media Streamer, a media server or application server. In the following, besides to a computer on which the application is installed to control the conference, so for example, the Media Streamer, media server or application server, the application for controlling the conference itself is called Media Server. To that extent, in the following, the term "Media Streamer", which is also called "conference server", is equally used for execution of the application software for controlling the conference in the form of software, and in a form of this application in hardware. The Media Streamer is set up to receive as a server from each of the communication terminals of the conference participants the respective audio/video signals and to transmit the mixed audio/video signals to communication terminals of the conference participants. There is a difference such that for active participants all except the own image/voice is mixed individually by the conference unit, whereas for passive participants in streaming mode all passive users receive the same images/voice. Therefore the streaming mode is advantageous in large conferences because the processing power of the conference unit is significantly reduced compared to a case where for each participant all except the own image/voice is mixed individually by the conference unit. As a communication terminal of a participant may act a telephone unit, an IP Phone (IP: internet Protocol) or a PC client, wherein another communication terminal, such as a mobile telephone or another server, is possible.

Under a conference session it is in particular understood a conference in which at least two participants of the conference are not resident at a same place/location such that they cannot communicate with each other without the use of technical means. The communication of the participants will rather be executed via the mixing unit by mixing the voice signals of the participants, wherein said conference can be configured for example as a teleconference or videoconference. In a teleconference, participants communicate only by exchange of speech regardless of how the voice signals of the participants are transferred. Therefore, both a teleconference over a landline and a teleconference in which one or more participants communicate with each other over a cellular network are called a teleconference.

In addition, a conference in the form of a video conference is possible with image signals of the participants being transmitted in real-time to other participants in addition to the exchange of voice signals of the participants. In the following, however, a conference is also meant to comprise an application sharing wherein other media are to be exchanged between the participants of the conference in addition to the exchange of voice and video data of the participants, for example in the form of a transfer of data between the participants. This data can be shifted/delayed in time with respect to the real-time data of the voice and/or image signals of the participants and can be displayed on a screen, for example the screen of a personal computer. In general, the mixing unit in form of a Media Streamer can be connected via a network, for example, the intranet or the Internet, to the communication terminals of the participants of the conference. In this case, the voice and/or video and/or data signals are transferred in the form of data packets from one participant to another participant in the conference.

In a telephone conversation for example in a conference session, participants often activate mute for preventing persons from hearing background noise from their desk or in order to discuss another issue while participating in the conference session. This mute mode can be deactivated when the user presses an unmute or mute-off button. However there are times when a user forgets to press the mute-off button and by the time the participant starts to talk mute is still on. Then other participants of the conference are not able to listen to the talking participant until the talking participant realizes to unmute or mute-off and repeat the content already spoken. While there are mechanisms that detect voice activity and automatically switch-off the mute button, these highly sophisticated mechanisms require some time until the unmute has been activated for the voice of the formerly muted participant to be transmitted to the other participants. Under optimal circumstances the response behavior of this voice activity recognition and subsequent automatic unmute may require in the order of 2 to 3 seconds in which some useful information of the muted talking participant may be lost. It is therefore desired to better reduce a loss of information when a user of a conference session forgets to unmute.

A similar problem arises for a conference session where a single or few participants are actively participating and a large group of other participants is passive, i.e. listening only to the subject matter of the single or few actively participating participants. Such a case may arise in panel discussions or webinars. Active participants served via a fast communication channel may be served via a fast voice and/or video conferencing channel. Passive participants may be served vis a different slower voice and/or video conferencing channel leading to a delay in receiving the data for the passive participant when compared to a same point-in-time of reception of the data by an active participant. The delay is not critical for the passive participant as long as the participant stays passive. However, a passive participant may want do an utterance or temporarily take part in the discussion of the active participants, typically introduced by a so called "raise hand" or similar indication. After this indication, the administrator or moderator may turn a passive participant into an active participant with a notification. Thus, the participant that indicated to take part in the discussion of the active participants gets connected via real-time to a point-in-time of the discussion he is not aware of because of the streaming delay prohibiting this participant to catch up to point-in-time of the real-time discussion. This situation is comparable to the situation as described for a muted participant forgetting to unmute before starting to talk. It is thus desired to better reduce a loss of information when a passive user receiving delayed data with respect to an active user of a conference session is turned into an active user. It is therefore the object of the invention to provide a method which better reduces a loss of information when a passive user of a conference session is turned into an active user.

SUMMARY OF THE INVENTION

We provide a method of controlling a real-time conference session by a computer program product causing a computer to execute the method described herein, and by the communication system for controlling a real-time conference session as described below.

The inventive method of controlling a real-time conference session comprises the following steps. Connecting a first communication terminal of a first user and a second communication terminal of a second user to a media processing unit for transmitting of audio and/or video data between the first user and the second user, wherein the conference session comprises a passive mode of the first user, wherein the data is received and transmitted by the first communication terminal as passive data but not received by the second terminal, and an active mode of the first user, wherein the data is received and transmitted by the first communication terminal and received by the second terminal as active data, switching from the passive mode to the active mode at a switching point-in-time, wherein after the switching a first duration of the passive data of the first user, the first duration ending at or starting from the switching point-in-time, is left to be transmitted to the second user, recording of the first duration of the passive data and a second duration of the active data of the first user, the second duration starting from the switching point-in-time, compared to the recording hastened replaying of the recorded first duration of the passive data and the recorded second duration of the active data to the second user after switching, the replaying starting from the switching point-in-time, and, when a synchronization delay, i.e. a synchronization duration between a first end of the second duration of the active data of the first user during recording and a second end of the replayed second duration of the active data after recording, is equal or smaller than a predetermined duration, e.g. n times 10 msec. with n being an integer between 1 and 10, preferably 3 to 5, and more preferably chosen such, that the predetermined duration is not perceived by the first and/or second user, switching-off of the recording and starting to transmit the data of the first user in real-time to the second user.

The conference session may be established by a Media Streamer such as a Web-server or by conference unit such as a DSP unit (DSP: Digital signal Processor) or a conference bridge. The audio and/or video data may be transmitted as RTP packets (RTP: Real-time Transport Protocol). A single or several media processing units coupled to a distributed media processing unit may be used. Each of the first and second communication devices may be a wired telephone, a cellular phone, a computer such as a PC or tablet-PC, a server or the like. In the passive mode the audio and/or video data may be transmitted or streamed for reception of a given user only. Thus, the communication terminal of the user in passive mode is not allowed to transmit data to the media processing unit. The audio and/or video data of the passive mode may be transmitted at a smaller data rate leading to a lower quality of service and/or slower transmission speed compared to the transmission of the audio and/or video data of the active mode. For example, in a video conference, the passive mode may not transmit image data but only audio data for reception by a passive user. A higher quality of service channel may be reserved for the active mode. Different transmission channels are used for the active and passive channels, respectively. The active mode may transmit the data to and from the communication terminal in real-time. During the playing back of the recorded data such a real-time active mode is defined to still transmit in the active mode although the second user is not receiving the data in real-time yet.

The first duration ending at the switching point-in-time corresponds to the duration for the voice recognition and subsequent automatic unmute of two to three seconds. During this first duration, the other users of the conference session cannot listen to the still muted and thus passive participant and this muted duration is left to be transmitted to another user such as the second user. The first duration starting from the switching point-in-time corresponds to the delay in receiving of the data for the passive user when compared to a same point-in-time of reception of the data by an active user served by a faster communication channel than the passive user. While active users may be served via real-time voice and/or video conferencing over (S)RTP [(Secure) Real-time Transport Protocol] via SIP (Session initiation Protocol) or WebRTC (Web Real-time Communication) communication platforms, passive users may be served via voice/video streaming over HTTP(S) [Hypertext Transfer Protocol (Secure)], also known as DASH (Dynamic Adaptive Streaming over HTTP) or HLS (HTTP Live Streaming) protocol Streaming based protocols deliver media in form of audio and/or video data with a streaming delay in the order of 3 to 5 seconds compared to a real-time delay of a few hundred milliseconds. Therefore, the first duration starting from the switching point-in-time may be in the same range, i.e. 3 to 5 seconds.

Having recorded the first duration left to be transmitted to the second user and continuing to record the second duration of the active data of the first user starting from the switching point-in-time allows reconstructing the data not transmitted to the second user while providing a seamless transition to the data of the first user in the active mode. The recorded data is replayed in a faster speed than the recording speed, i.e. hastened replayed compared to the recording, wherein the recorded first duration of the passive data and the recorded second duration of the active data to the second user are replayed after switching starting from the switching point-in-time. Due to the hastened replay, it is possible to gradually reconstruct the lost content of the first duration in time to catch up with the taster or real-time or transmission provided in the active mode. When a synchronization delay between a first end of the second duration of the active data of the first user during recording and a second end of the replayed second duration of the active data after recording is equal or smaller than a predetermined duration, e.g. 10 to 30 msec. (milliseconds) which is not perceived by the first and/or second user, the recording is switched-off and the data of the first user after the switch-off is transmitted in real-time to the second user. This way, the second user receives a summary in time of the first duration not received yet and the subsequent content of audio and/or video data of the first user in the active mode until it is no longer required to record the data and possible to switch back to the direct transmission of the data of the first user to the second user. The hastened replaying of the recorded passive data and the recorded active data replaces a transmission of the active data of the first user to the second user in real-time right after switching from passive to active mode. After switching from the passive mode of the first user to the active mode of the first user, the data of the first user may be transmitted not only to the second user but also to the first user. Thus, the first user can listen to the delayed data between the end of his passive mode and the beginning of his active mode by catching up with to real-time delay of a few hundred milliseconds while finishing the streaming with the delay of few seconds. By introducing the media processing unit it is possible to simultaneously record and play back data of the first user that without the media processing unit would be lost when switching the first user from passive mode to active mode. With the present invention, the media processing unit is intervened between the first terminal and the second terminal as an additional component that performs audio and/or video recording and playing at the same time after the switching point.

A loss of information of the recorded first duration of the passive data and/or the recorded second duration of the active data is advantageously introduced during the recording and/or the replaying for achieving the hastened replaying, e.g. by implementing a loss system comprising dropping or skipping single or several speech samples and/or frames of the recorded first duration of the passive data and/or the recorded second duration of the active data. In digital audio/video systems of the present invention hastened replay can be facilitated e.g. by implementing loss system are tolerating a certain degree of service degradation that either is preferably without degradation of the perceived user experience. In case of audio different codecs exist for which encoders simply encode speech samples one-to-one from a fixed time slice e.g. ITU-T G.711. The codecs are more suitable compared to codecs applying additional algorithms for which time slices may span over more than one speech sample. Speech samples are populated into frames which in turn are packetized for transmission over the communication network/system of the conference session. The encoder at the sender side of the communication terminal may generate the continuous stream in real-time conveyed encrypted within sRTP over UDP packets, each carrying a few or a small number of speech samples as a trade-off between a risk of packet loss and a protocol overhead. The RTP packets include an identification of the codec in use and a time-stamp allowing re-sequencing and identifying packet loss over the transport network. After decrypting the RTP payload, the payload may be stacked as a bit-stream onto the jitter-buffer accommodating propagation delay variations of the transport network between the first communication terminal. From this buffer, the decoder may consume this bit-stream for replay at the audio device of the receiver which may be embodied as the media processing unit.

Hastened replay of the audio/video-stream may foe facilitated by implementing a loss-system in front of the decoder in the first communication terminal that drops every n-th speech sample (m times 10 msec) before stacking the speech samples to the jitter-buffer of the first communication terminal. Bulk dropping must be avoided, i.e. providing a small number of m, for which the number of m is typically known that does not impact the user experience for the first and/or second user, e.g. m can be determined in quality measures of the codec to a predetermined value. A further additional embodiment is to hasten the replaying by shortening packet included silence periods of the audio data for which comfort noise patterns that may be injected by the first communication terminal are recognized. In case of video, the hastened replay e.g. is facilitated similar to the Video-Cassette-Recorder ("VCR")-capability "Forward". During forwarding the first communication terminal or the media processing unit advantageously decodes the received information at faster speed and may skip certain frames of the video data transmitted in packets. Up to double speed, even a faster speed, audio may be retained. MPEG and related video codecs know (I)ntra, (P)redicted, and (B)i-directional frames. During fast/faster forwarding e.g. the decoder may skip the (B)i-directional frames or subsequent B-frames for speeding up/hastened replay.

The predetermined duration of the synchronization delay in an embodiment is defined as n times 10 msec., wherein n is an integer preferably chosen such that the synchronization delay is not perceived by the second user, e.g. by choosing n as an integer between 1 and 10, preferably as 6, more preferably as 3. The number n is proposed to be chosen such that the receiving person, e.g. the second user, does not sense/notice the synchronization delay. The value for n may not only depend on the subjective perception of the receiving person but also on the quality of the transmission network between the first communication terminal, the media processing unit, and the second terminal. The lower the quality of service of the transmission network, the smaller may the number n be chosen. If, on the other side there are already perceivable interrupts in the communication channel between the first user and the second user, the number n may be chosen such that the interrupt introduced by the synchronization delay is not perceived to a higher degree than other interrupts in the communication channel without the synchronization delay being transmitted.

In an embodiment it is proposed that, when the first user is interrupted by the second user of another user of the communication session at a first interruption point-in-time after the recording of the second duration of the active data of the first user has started, the hastened replaying of the recorded first duration of the passive data and the recorded second duration of the active data to the second user ends at the first interruption point-in-time and the switching-off of the recording and starting to transmit the data of the first user in real-time to the second user is shifted to the first interruption point-in-time. In this case, the switching-off of the recording and starting to transmit the data of the first user in real-time is shifted in time to the first interruption point-in-time for giving the interrupting user a chance for his utterance. After the interruption, the first user may stop talking and wait for the other interrupting user to finish. At the first interruption point-in-time, the recording finishes together with the replaying. Consequently, information of the recorded data of the first user that has not yet been replayed is not transmitted to the second user.

A particularly advantageous embodiment arises, when in the passive mode the first user is muted and does not activate an unmute function for getting switched to the active mode after starting to speak. In this embodiment, the first duration ending at the switching point-in-time and left to be transmitted to the second user comprises a voice activity detection response duration according to a response behavior of a voice activity detection unit, wherein, when the voice activity detection response duration, i.e. a duration of the response behavior of the voice activity recognition, ends, the switching from the passive mode of the first user to the active mode of the first user is triggered by a voice activity detection unit by automatically activating the unmute function. In combination with the features of recording of the first duration of the passive data and the second duration of the active data of the first user starting from the switching point-in-time, the hastened replaying of the recorded first duration of the passive data and the recorded second duration of the active data to the second user starting from the switching point-in-time, and switching-off of the recording and starting to transmit the data of the first user in real-time to the second user, when the synchronization delay between the first end of the second duration of the active data of the first user during recording and the second end of the replayed second duration of the active data of the recording is equal or smaller than a predetermine duration, this embodiment is a solution to the object of the present invention to provide a method which better reduces a loss of information when a user of a conference session forgets to unmute.

When in real-time communications over IP there is an intentional delay to be introduced for synchronizing streams of the first user and the second user of the conference session, it is proposed in another embodiment that at least part of the voice activity detection response duration is utilized as the intentional delay. During the voice activity detection response duration the first user is still muted and cannot be heard by the second user (yet). It is therefore advantageous for the second user when an intentional delay for synchronizing streams of the conference session is not introduced as such, but part of the voice activity detection response duration required to detect the voice of the first user for automatically unmuting the first user is utilized as the intentional delay.

A further embodiment addresses the case, when the first user is interrupted by the second user at a second interruption point-in-time before the recording of the second duration of the active data of the first user has started. The switching-off of the recording and starting to transmit the data of the first user in real-time to the second user is then shifted to a point-in-time when the voice activity detection response duration ends, wherein the hastened replaying of the first duration of the passive data ends at the point-in-time when the voice activity detection response duration ends. Consequently, all other information being sent after the voice activity detection unit has detected voice is not transmitted to the second user so the second user will only hear what has been sent by the first user while the first user was on mute. The first user may also hear his replayed voice until the voice activity detection response duration ends. So, the first user knows that whatever he said before the interruption has been transmitted to the second user. Afterwards, it is up to the first and/or second user to decide who will continue to talk as it often happens in conference sessions when two users of trying to talk at the same time.

In large conference sessions or webinars, the passive mode is switched in another embodiment to the active mode by an administrator of the conference session and/or automatically by an indication recognition means recognizing an indication and executing the switching from the passive mode to the active mode in response to recognizing the indication, when the first user has given the indication to the administrator and/or indication recognition means that he intends to be switched from the passive mode to the active mode, e.g. in form of a gesture such as a hand raise or a push on an indication button or touchpad. The indication recognition means may comprise a single or several cameras for detecting optical data of the first user which is processed for retrieving optical indication of the first user. The indication recognition means may alternatively or in addition comprise one or more microphones for recording and retrieving an audio utterance of the first user. If several microphones and/or cameras are utilized, the location/position, of the first user may be detected by processing time-of-flight information from the microphones and/or cameras. The indication recognition means may be comprised by the media processing unit or realized as a stand-alone unit.

According to another embodiment of the present invention, the passive data is transmitted at a lower data rate than the data rate of the active data, wherein the passive data is received by the first user with a passive delay with respect to the active data, wherein the passive delay corresponds to the first duration of the passive data of the first user which starts from the switching point-in-time and is left to be transmitted to die second user. This embodiment addresses the case where in the active mode the audio-video data is transmitted in real-time, whereas in the passive mode the audio/video data is transmitted at a lower speed than in the active mode by streaming. In case of more than two users, the passive data may be transmitted to the first user in another embodiment by a mixing unit in form of a media streaming unit. e.g. a Web-server, introducing the passive delay as a streaming delay of streaming delay duration, e.g. 1 to 10 seconds, preferably 3 to 5 seconds. Therefore, in combination with the features of recording of the first duration of the passive data and the second duration of the active data of the first user starting from the switching point-in-time, the hastened replaying of the recorded first duration of the passive data and the recorded second duration of the active data to the second user starting from the switching point-in-time, and switching-off of the recording and starting to transmit the date of the first user in real-time to the second user, when the synchronization delay between the first end of the second duration of the active data of the first user viewing recording and second end of the replayed second duration of the active data of the recording is equal or smaller than a predetermined duration, these respective embodiments are a solution the other object of the invention to provide a method which better reduces a loss of information when a passive user, who receives audio and/or video data with a delay compared to an active user, of a conference session is turned into an active user.

The passive data of the streaming delay during recording may be streamed in a further embodiment preconditioned for the hastened replaying, e.g. by reducing a transfer delay and/or omitting complementary encoding layers of the passive data of the streaming delay. The preconditioning may be realized by transmitting different data streams to the first user who has indicated that he wants to be switched from passive mode to active mode and to the second user who has not indicated that he wants to be switched from passive mode to active mode. The preconditioned data stream may be generated in the media processing unit for the first user. The same or other preconditioned data streams may be generated in the media processing unit for other potentially switched passive users.

A computer program product may be provided which, when run on a computer, causes the computer to execute the inventive method as outlined above. The computer program product may be a software product comprising instructions. The computer program product may be comprised by a machine readable medium, wherein the machine-readable medium may be a floppy disc, a CD (Compact Disc), a DVD (Digital Versatile Disc) or any other suitable digital or analog medium.

The invention further comprises a communication system for controlling a real-time conference session comprising: A first communication terminal of a first user, a second communication terminal of a second user, and a media processing unit, wherein the first communication terminal and the second communication terminal are connected to the media processing unit for transmitting of audio and/or video data between the first user and the second user, wherein the communication system is configured to allow the conference session to comprise a passive mode of the first user, wherein the data is received at and transmitted by the first communication terminal as passive data but not received by the second terminal, and an active mode of the first user, wherein the data is received and transmitted by the first communication terminal and received by the second terminal as active data. The communication system further comprises switching means for switching from the passive mode to the active mode at a switching point-in-time, wherein after the switching a first duration of the passive data of the first user, the first duration ending at or starting from the switching point-in-time, is left to be transmitted to the second user, recording means for recording of the first duration of the passive data and a second duration of the active data of the first user, the second duration starting from the switching point-in-time, replaying means for compared to the recording hastened replaying of the recorded first duration of the passive data and the recorded second duration of the active data to the second user after switching, the replaying starting from the switching point-in-time, and switching-off means for switching-off of the recording and starting to transmit the data of the first user in real-time to the second user, when a synchronization delay between a first end of the second duration of the active data of the first user during recording and a second end of the replayed second duration of the active data after recording is equal or smaller than a predetermined duration.

As an embodiment for more than two users of the conference session, the invention comprises the communication system further comprising a mixing unit in form of a media streaming unit, e.g. a Web-server, for providing conference features or a conference unit, wherein the media processing unit and/or the mixing unit are arranged inside of a private branch exchange such as a Private Automated Branch Exchange. In case of audio/video data transmission in the conference session, the data may not be transmitted via the PBX but via the media server in form of the Web-server which may be connected to the media processing unit. The Web-server and the media processing unit may be linked to the decomposed PBX which handles call/session control and protocol handling. The media processing unit may generate announcements such as feedback tones and handled the conferencing in terms of mixing audio/video data signals and the connection to the first and second communication terminals. When the Private Automatic Branch Exchange (PABX) is used, such a PBX may be realized as a server that automatically provides switching functions. According to the invention, it is proposed in an embodiment, that part of or all the functions of the media processing unit, such as the switching from the passive mode to the active mode, the recording of the first duration of the passive data and the second duration of the active data of the first user, the hastened replaying compared to the recording of the recorded first duration of the passive data and the recorded second duration of the active data to the second user after switching, and, when a synchronization delay between a first end of the second duration of the active data of the first user during recording and a second end of the replayed second duration of the active data after recording is equal or smaller than a predetermined duration, the switching-off of the recording and starting to transmit the data of the first user in real-time to the second user, and/or part of or all the functions of the Media Streamer such as the mixing of the data streams of the first and second users are arranged inside of the private branch exchange such as the Private Automatic Branch Exchange.

Further embodiments and advantages of the invention are highlighted in the following with respect to figures. For an improved clearness, the figures are not true to scale or proportionate. In the figures, as long as not mentioned otherwise, same references indicate same parts with same meaning. It illustrates:

BRIEF DESCRIPTION OF THE DRAWINGS

FIG. 8 is a flow chart illustrating an exemplary method according to the invention.

DESCRIPTION OF THE PREFERRED EMBODIMENTS

Figure 1A:
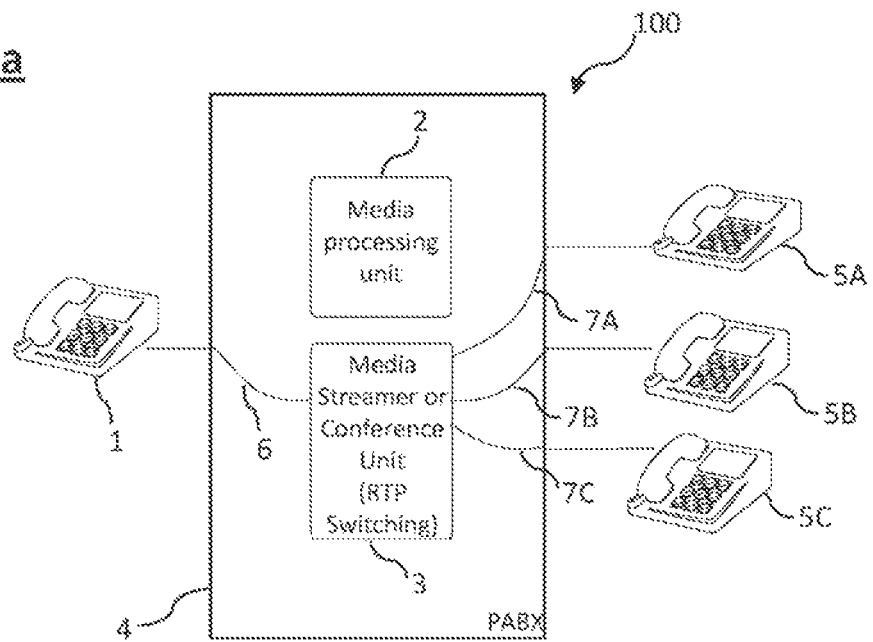
FIG. 1A, 1B schematic diagrams of a communication system for a conference session of four users comprising a media processing unit according to the invention in a first embodiment, FIG. 2 a schematic timeline of the method according to the invention comprising a muted user in second embodiment, FIG. 2A a flowchart of the schematic timeline of FIG. 2 according to the invention, FIG. 3 a schematic timeline of the method according to the invention comprising a real-time active mode and a delayed passive mode in a third embodiment, FIG. 4 a flowchart of the schematic timeline of FIG. 3 according to the invention, FIG. 5 a schematic timeline of the method according to the invention comprising an intended delay added by the communication system in a fourth embodiment, FIG. 6 a schematic timeline of the method according to the invention comprising an interruption after the switching from passive mode to active mode in a fifth embodiment, and FIG. 7 a schematic timeline of the method according to the invention comprising an interruption before the switching from passive mode to active mode in a sixth embodiment

FIG. 1A illustrates a communication system 100 for a conference session of four users. A communication terminal 1, e.g. a smart phone, a tablet PC, an IP Phone or a PC client, of the first user is connected to a mixing unit 3 in form of a Media Streamer, i.e. in form of a Web-server, or a conference unit via connection link 6. FIG. 8 illustrates an exemplary method in which an embodiment of the communication system 100 can be utilized. The transmission and mixing of data from users of the conference session is established by the communication system 100. Other protocols for transmission of the data between the users of the conference session are possible. Additional communication terminals 5A, 5B, 5C, e.g. wired telephones or cellular phones, of a second or more users are linked to the mixing unit 3 by communication links 7A, 7B, and 7C, respectively. The mixing unit 3 and a media processing unit 2 are comprised by a private automated branch exchange 4. When audio/video data of the uses are transmitted between the communication terminals 1, 5A, 5B, and 5C downstream, i.e. from the mixing unit 3 to the communication terminals 1, 5A, 5B, 5C, also called from a server to a client, and upstream, i.e. from at least one of the communication terminals 1, 5A, 5B, 5C to the mixing unit 3, also called from the client to the server, the exchange of data from the communication terminals, also called clients, occurs via the mixing unit 3 without involvement of the media processing unit 2. In an embodiment of only two users to be connected the mixing unit 3 would pass through the data of the first user and the second user without mixing. Alternatively, the mixing unit may be missing for a communication link between the first (1) and the second (5A) communication terminals using only the switching function of the PBX or PABX if required.

Figure 1B:
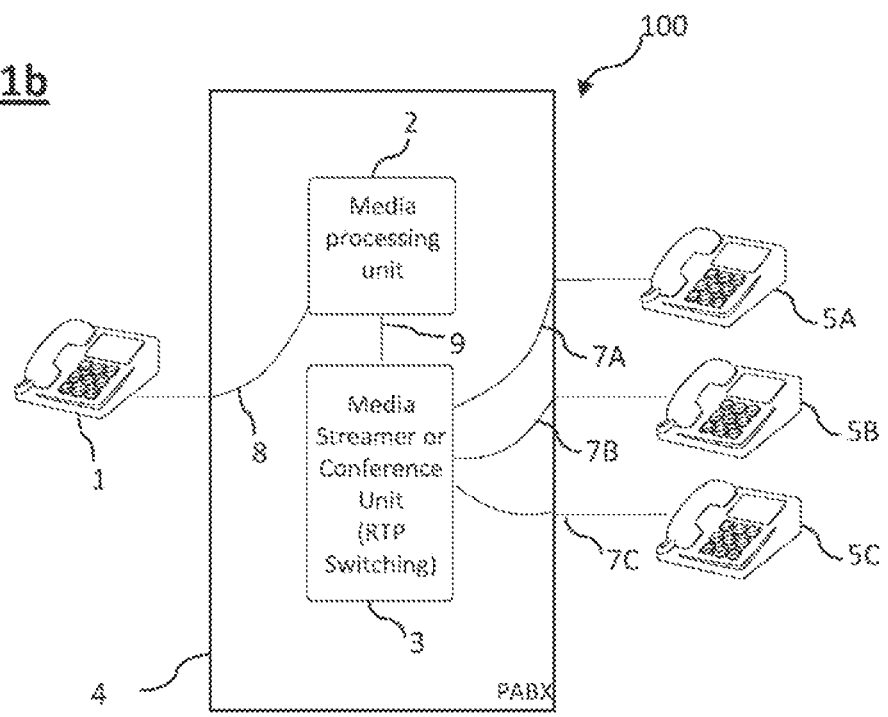

When the conference session comprises a passive mode, e.g. of the first user, wherein the data is received and transmitted by the first communication terminal 1 as passive data but not received by the second terminal, 5A, 5B, 5C, i.e. allowing transmission of the data upstream and downstream between the mixing unit 3 and the first communication terminal 1 but not downstream from the mixing unit 3 to the second communication terminal, 5A, 5B, 5C, and an active mode of the first user, wherein the data is received by the first communication terminal 1 from the second communication terminal, 5A, 5B, 5C and transmitted by the first communication terminal 1 to the second communication terminal, 5A, 5B, 5C, i.e. allowing the transmission of data downstream and upstream between the mixing unit 3 and the first communication terminal 1 and downstream and upstream between the mixing unit 3 and the second communication terminal, 5A, 5B, 5C, it is possible that after switching from the passive mode to the active mode the first duration of the passive data of the first user is not transmitted to the second user and therefore left to be transmitted to the second user. As shown in FIG. 1B, in such a case, the first communication terminal 1 is not directly connected to the mixing unit 3 but linked via communication link 8 to the media processing unit 2 which is linked via communication link 9 to the mixing unit 3. Instead of directly transmitting voice/video data after the switching from passive mode to active mode via the mixing unit 3 to the communication terminals 5A, 5B, 5C, the first duration of passive data left to the transmitted is recorded and replayed in a faster speed as the speed during recording and simultaneously to the recording by the media processing unit 2 after switching to the active mode in order to catch up with a real-time conversation in the active mode between the users of the conference session.

FIG. 2 illustrates the case of FIG. 1B for the embodiment that the first user is muted, also called mute-on mode or mute activated mode, which is defined as the passive mode, and there is a switchover from the mixing unit 3, which may be a conference unit (DSP unit), a conference server or a media processing unit, to the media processing unit 2. Following the switchover from the mixing unit 3 to the media processing unit 2 RTP packets received from the first communication terminal 1 are no longer directed in the communication system 100 to the mixing unit 3 but to the media processing unit 2, wherein the media processing unit 2 sends (processed) RTP packets to the mixing unit 3. The upper region 1A in FIG. 2 represents (a timing of data transmitted by) the first communication terminal 1. The lower region 2A in FIG. 2B represents the media processing unit 2 in a recording mode 2R and a replaying mode 2P. Before a switching point-in-time 13 of switching from the passive mode to the active mode, the media processing unit 2 starts recording, 11, when the first user activates mute-on, 12, which may retain a time window for saving memory used for recording in the media processing unit 2. The lengths of the horizontal arrows 12 to 26 displayed in FIG. 2—and other horizontal arrows in FIGS. 3, 5, 6, and 7—represent relative durations/periods in tune to each other (see direction of arrow of time "t" in the upper left corner of FIG. 2—and "t" in FIGS. 3, 5, 6, and 7).

At some point-in-time after muting the first user decides to talk at the beginning of arrow 13 representing a voice activity detection response duration. The voice of the first user is detected at the end of the voice activity detection response duration 13, which may be in the order of 1 to 3 msec. When the muting is automatically deactivated after a certain period of time, this means that during the muting duration a content spoken by the first user would be lost if not recorded by the media processing unit 2. The first user continues to talk after the point-in-time when the mute is deactivated and payload has been established upstream and downstream between the first user and the second user.

The voice activity detection response duration 13 in this embodiment is the first duration of the passive data, which is recorded along with a second duration 14 of the active data of the first user starting from the switching point-in-time 13A of the switching from passive mode to active mode. Therefore, at the start of the second duration 14 mute is deactivated automatically by switching to the active mode, and whatever was said during the voice activity detection response duration 13 is transmitted from the media processing unit 2 to the mixing unit 3. As the end point-in-time for the voice activity detection response duration 13 is not known up front, the recording may be arranged for all the users of the conference session by an individual Round recording buffer per user e.g. at the media processing unit 2 or the mixing unit 3, the Round Robin process referring to a pattern or ordering whereby recent recordings overwrite previous recording sequences per user in a circular manner.

Compared to the recording speed a faster speed is chosen for a hastened replaying of the recorded first duration 13 of the passive data and the recorded second duration 14 of the active data via the media processing unit 2 and transmitted to the communication terminals 5A, 5B, 5C via the mixing unit 3 and communication links 7A, 7B, 7C (see smaller lengths of the replayed voice activity detection response duration 23 and replayed second duration 24 to the recorded voice activity detection response duration 13 and recorded second duration 14. The recording continues as illustrated in FIG. 2 by the second durations 15, 16. The hastened replaying continues as long as a synchronization delay 27 between a first end 18 of the second duration 16 of the active data of the first user during recording and a second end 26A of the replayed second duration 26 of the active data after recording is equal or smaller than a predetermined duration. The media processing unit 2 therefore continues to replay to the mixing unit 3 the recorded second durations 15, 16 as replayed second durations 25, 26 until the replayed audio/video data of the first user is within a predetermined duration for a synchronization delay 27. When the synchronization delay is within the predetermined duration, which may be 10 to 100 msec., preferably 30 to 50 msec., there is a switching-off of the recording at a switchover point 17 where the media processing unit 2 no longer records and no longer replays such that the mixing unit 3 is now supplied with audio/video data by the communication terminal 1 (see second duration 19 in active mode) without involvement from or detouring of the media processing unit 2. This way, the communication system 100 starts to transmit the data of the first user in real-time to the second user.

Figure 2A:
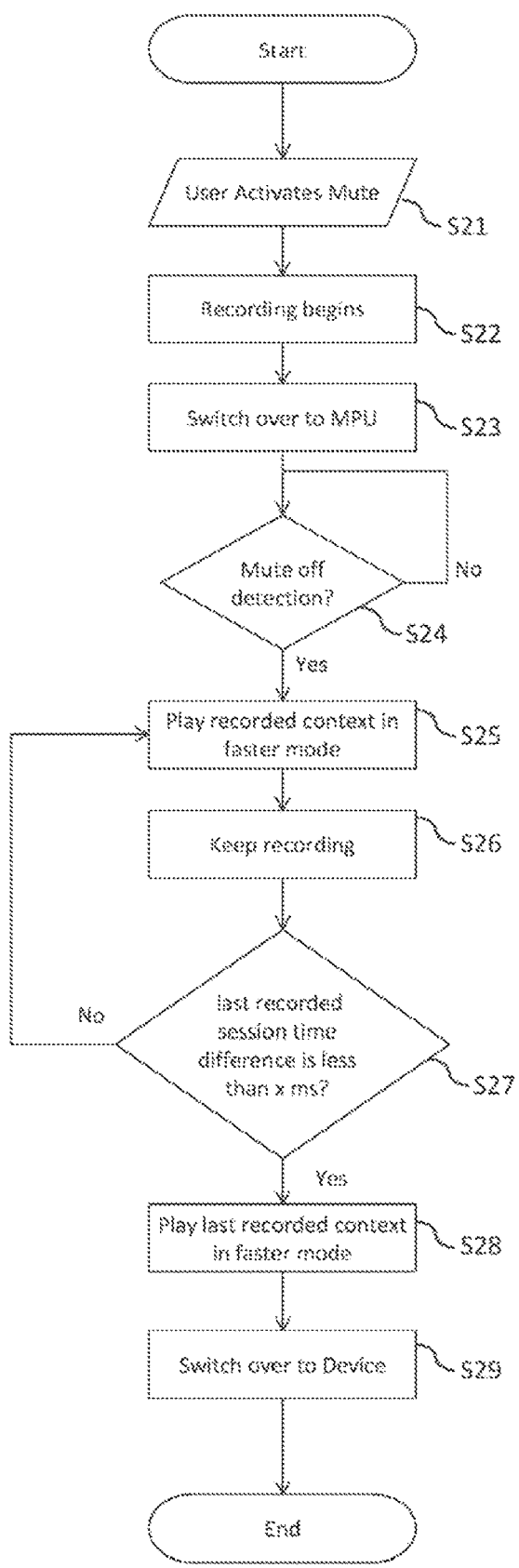

The flowchart of the schematic timeline of FIG. 2A starts with the first user activating mute, S21, wherein the recording, S22, begins, leading to a switchover to the media processing unit 2, S23, which initiates the mute-off detection, S24, in the form of a voice activity detection. The mute-off detection continues until the first user starts talking leading to a switchover from passive mode to active mode and hastened replaying, S25, of the recorded/video data of the first user compared to the speed of recording. The recording continues, S26, as long as the last recorded session time difference, also called synchronization delay, is less then predetermined duration measured in milliseconds, S27 (see x ms in step S27 in FIG. 2A, wherein x is an integer, e.g. 1 to 100, preferably 30-50, and ms are milliseconds). Once the predetermined duration is reached or undercut, the last recorded second duration of the active data is replayed in faster mode, S28. Then, the communication system 100 switches over to the first communication terminal 1, S29, where the flow of FIG. 2A ends.

Figure 3:
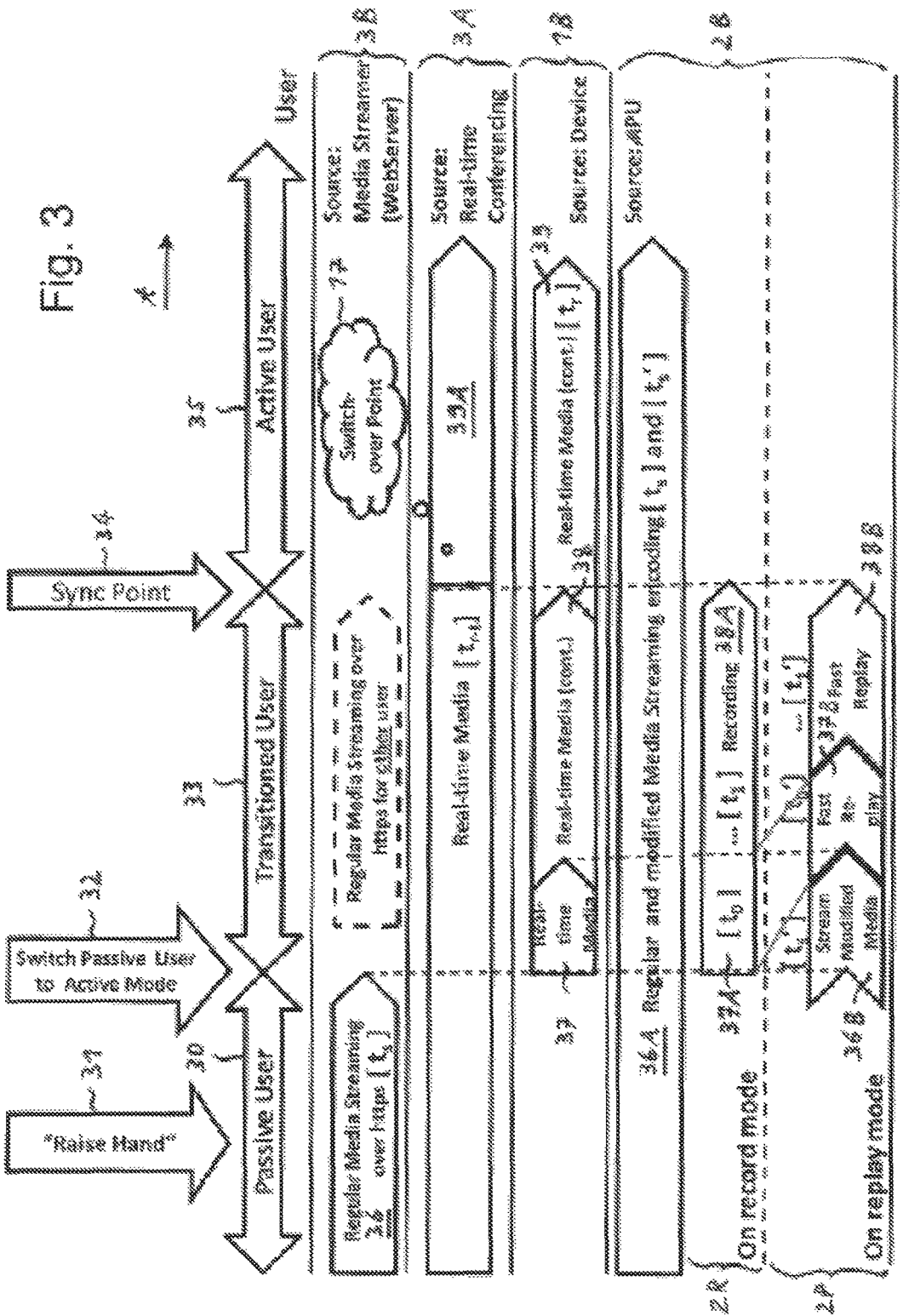

FIG. 3 illustrates another embodiment of the invention in a schematic timeline comprising a real-time active mode and a delayed passive mode. The first communication terminal 1 (and a timeline of the data transmission thereof) is represented by horizontal bar 1B, whereas the media processing unit 2 is represented by horizontal bar 2B. A conference session with active and passive participants/users is established by the communication system 100. The users are served differently in terms of active users communicating with real-time media exchanged via e.g. a conference server, 3A, and passive users receiving media/data by streaming, 36, e.g. over https delivered e.g. by a Media Streamer, typically a Web-server, 3B, wherein the conference server and the Media Streamer may by comprised by the mixing unit 3. This embodiment may occur especially in a conference of a large number of participants, e.g. tens or hundreds of users as passive users and a few users as active users. The media streaming may be subject to significant additional delay (approximately 3-5 sec) compared to real-time communication of the active mode. Thus, streaming may not be suitable for online, i.e. real-time, communication but may be sufficient to save processing power at the conference and/or mixing unit for a large number of passive users, because the media sent by passive users are not required to be processed as long as the streaming delay is not perceived by users staying in passive mode.

However, a passive user may change to an active user to contribute to the discussion of the active users. To this end, e.g. from Webinars the notion of "Raise Hand", 31, is known for passive users, 30, that may be muted to avoid background noise in large or mobile configurations. Based on this user indication of the first user a moderator by user interaction or the communication system 100 automatically may switch the first user from passive to active mode, 32. Due to a non-negligible encoding delay, the real-time communication may be a few second ahead of the streaming communication leading to a time gap to be caught up with smoothly, preferable not perceived by the transitioned first user 33 and/or the other conferees such as the second user. This is a similar scenario compared to the automated un-mute applying voice (activity) detection with the difference that the point-in-time of switching from passive mode to active mode is known/triggered by the communication system 100 and not by the first user. Hence, the embodiment illustrated in FIG. 3 is different in this respect.

At the point-in-time of switching the first user from passive mode to active mode, 32, the media processing unit 2 starts recording, 37A, of the real-time media 37 captured from the first communication device 1. At the switching point-in-time 32 a replay buffer (not shown) of the media streaming may still contain media frames, 36B, to be delivered to the first user's first communication device 1 to avoid information loss. In another embodiment, the media processing unit 2 may provide at least one preconditioned/optimized media/data stream 36A in parallel to the regular media streaming 36 for the purpose of saving time during replay, e.g. in form of processed data comprising a reduced transfer delay and/or omitted complementary encoding layers compared to the regular media streaming 36. As soon as the remaining frames 36B are delivered by the regular media stream 36 and/or the preconditioned media streaming 36A of the media processing unit 2 by replaying, the hastened replay (see replayed duration 37B) of the recorded duration 37A of the real-time data 37 after switching to active mode starts (seamlessly) continuing with the replayed duration 38B of the meanwhile recorded media (see duration 38A) of the real-time duration 38 until the replayed media/data is timely within a predetermined synchronization delay with the real-time media. This is the point-in-time where the first user is switched from the media processing unit 2 to a conference server comprised by the mixing unit 3. At the switching-off point-in-time 17 of the recording, 2R, also called Sync Point 34, starts the transmission of real-time data from the first communication device 1 to the mixing unit 3, i.e. upstream, 39, and from mixing unit 3 to the first communication device 1, i.e. downstream, 39A. The transitional mode 33 and the active user mode 35 of the first user following the Sync Point 34 are defined to be comprised by the active mode starting from the switching point-in-time. Concluding, the timeline, starting with duration 37B corresponds to the un-mute use illustrated in FIG. 2 starting from the second duration 24.

Figure 4:
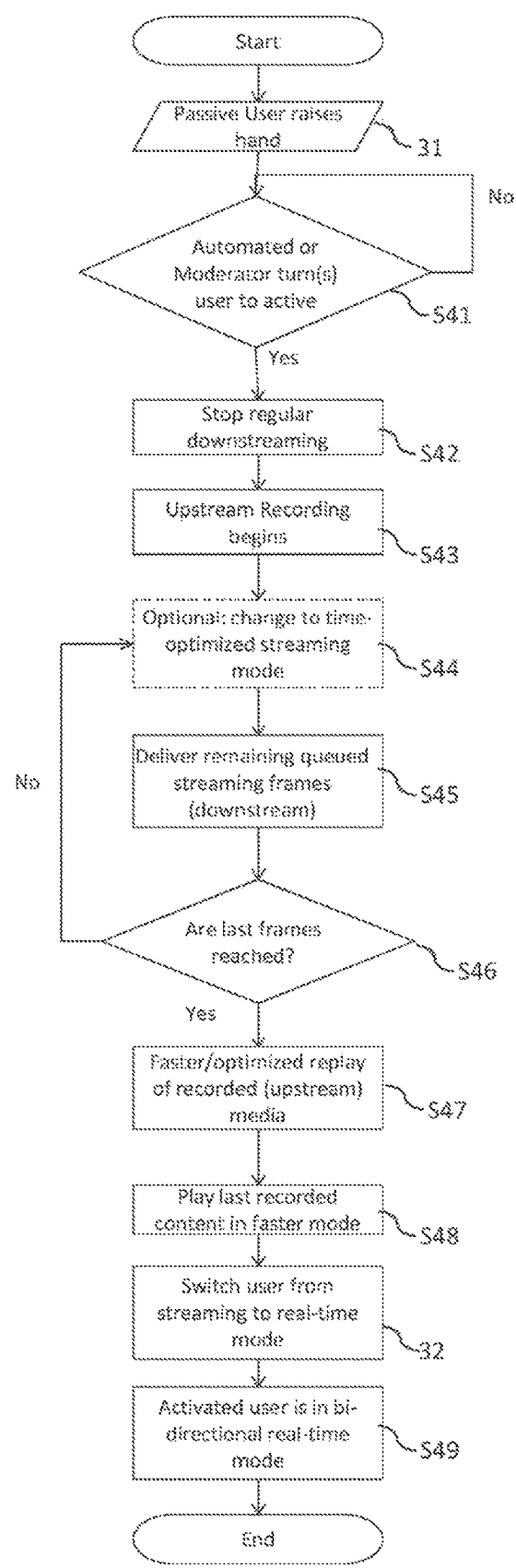

FIG. 4 illustrates a flowchart of the schematic timeline of FIG. 3 and starts with the first user being a passive user raising hand, 31. A moderator/administrator of the conference session switches the first user from passive mode to active mode, S41, which stops the regular streaming from the Media Streamer to the first communication terminal 1 (down streaming, S42). It begins a recording, S43, of audio/video data being streamed (in passive mode) from the second communication terminal 5A, 5B, 5C to the media processing unit 2, i.e. upstream, wherein the media processing unit 2 may provide optionally a modified/pre-conditioned media stream in order to promote hastened replaying, S44, in addition to or instead of the recorded stream of S43. Remaining queued streaming frames are transmitted, S45, from the media processing unit 2 to the first communication terminal 1. Once the last frame has been transmitted, S46, to the first communication terminal 1, replaying of the preconditioned remaining queued streaming frames or of the remaining queued streaming frames without preconditioning and subsequently hastened replaying of the recorded media/data which have been transmitted to the media processing unit 2 (upstream) starts, S47. Once the last recorded content of the recorded data has been replayed, S48, the recording of the first user is switched-off and the first user is switched from streaming to real-time in the active mode, 32. The first user is then in active mode (activated) which enables bi-directional real-time communication between the first user and the second user, S49, which ends the flow illustrated in FIG. 4.

Figure 5:
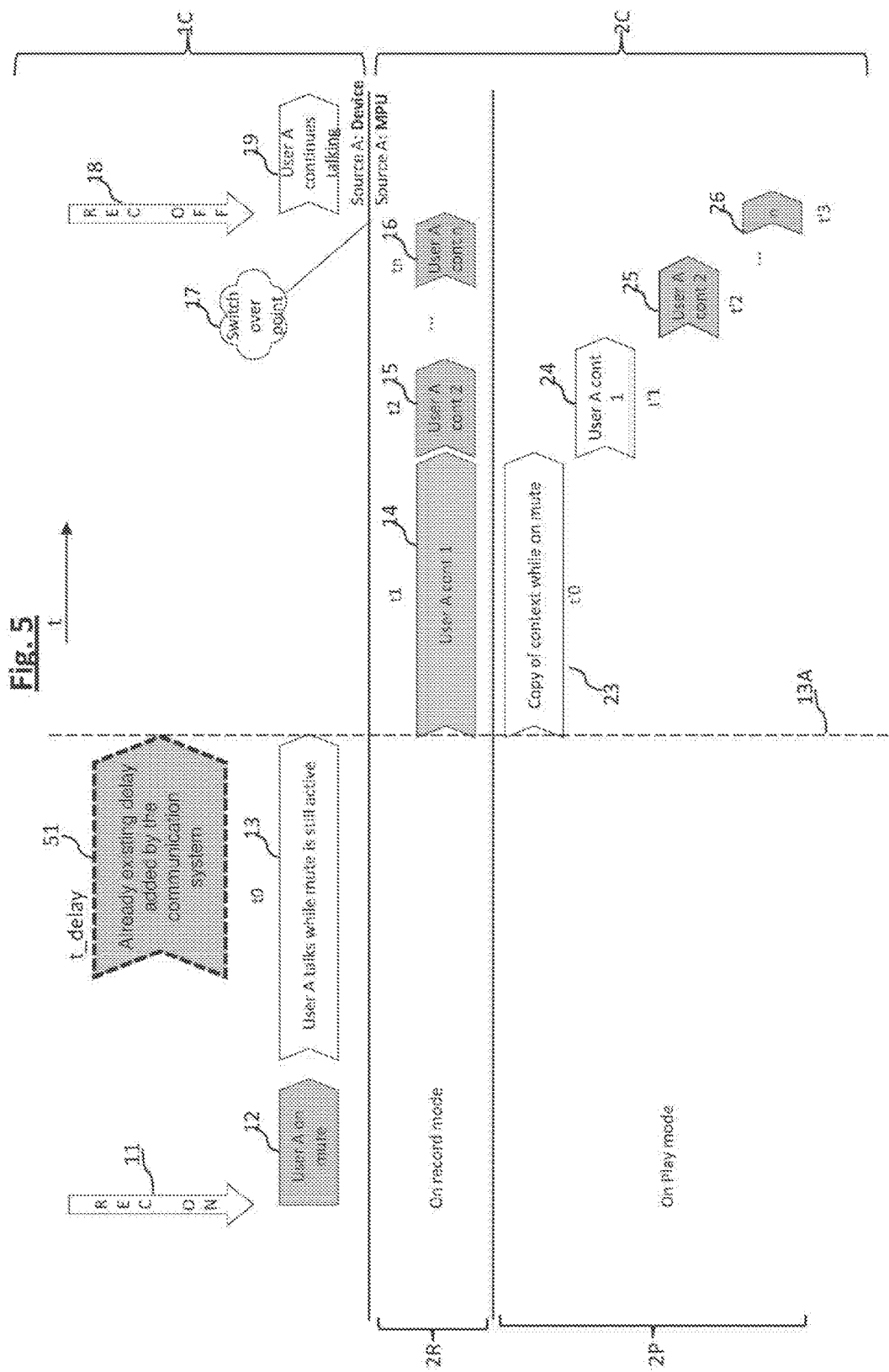

FIG. 5 illustrates a schematic timeline of the inventive method comprising an intended delay 51 added by the communication system 100 to synchronize the data streams of the users of the conference session. For avoiding repetitive description, only the differences to FIG. 2 are highlighted. In the upper region 1C of FIG. 5, the first communication terminal 1 is represented, while the media processing unit 2 is represented in the lower region 2C. Especially in real-time communications over IP intentional delays may be introduced in order to synchronize streams. The intentional delay effect that other users may hear the voice of the first user sometime later then the first user himself. This intended delay can be exploited by prioritizing streams of users that use the inventive method. By providing part of the voice activity detection response duration 13 as the intended delay the silence duration is deterred to a smaller amount. Instead of generating an intended delay for synchronizing data streams of users of the conference session, at least part of the voice activity detection response duration 13 is utilized to provide the intended delay 51. As the voice activity detection response duration is the duration of silence with the first user still being muted, the silence duration may occur during this intended delay.

Figure 6:
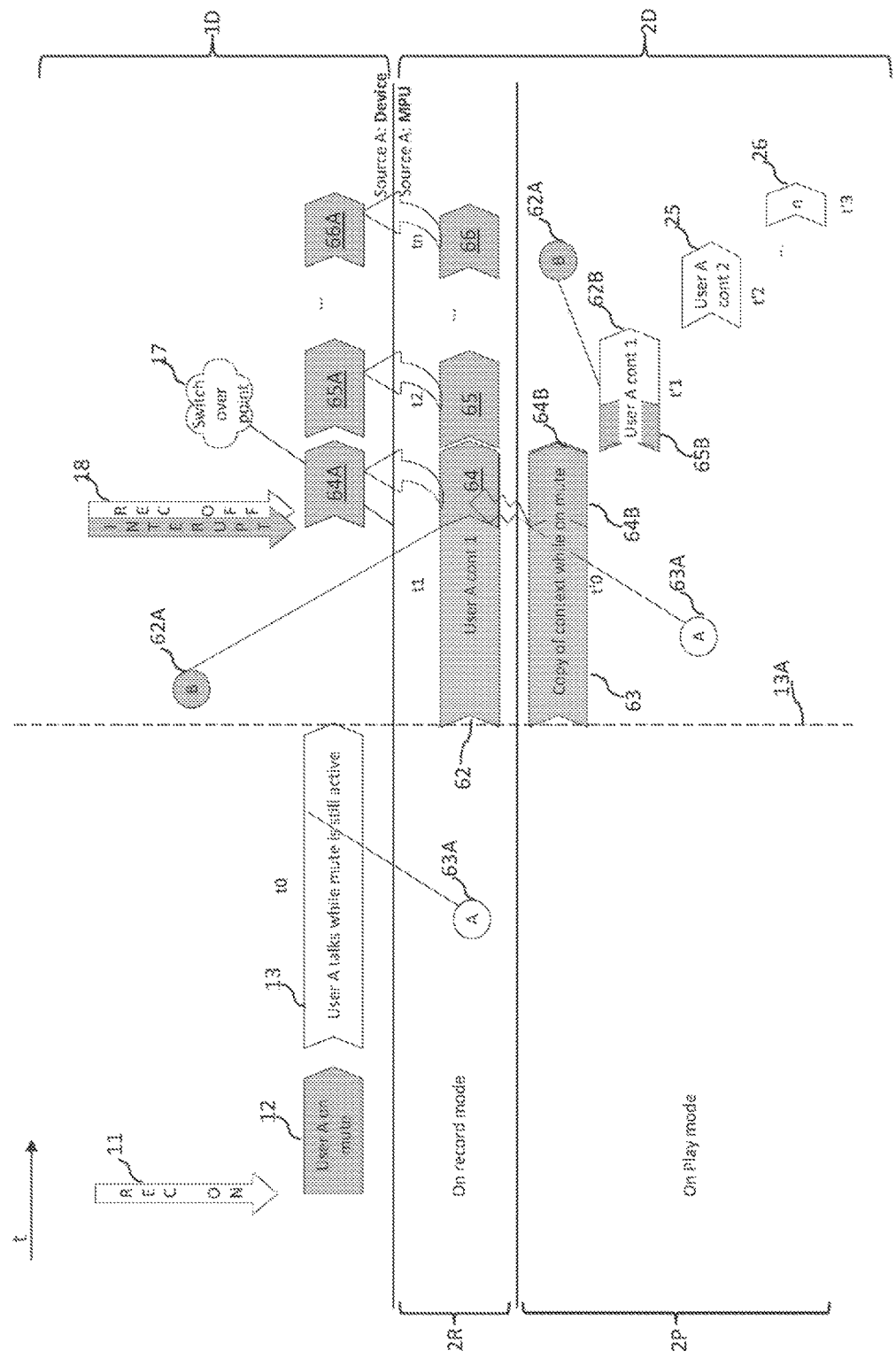

FIG. 6 illustrates a schematic timeline of the inventive method comprising an interruption after the switching from passive mode to active mode. The embodiment addresses the case where the second user as another user intervenes while the media processing unit 2 replays the recorded voice/video content of the first user. In the upper region 1D of FIG. 6, the first communication terminal 1 is represented, while the media processing unit 2 is represented in the lower region 2D. The other user is interrupting the conversation which leads to an interruption of the replaying at an interruption point-in-time 61. When the other user is interrupting the first user, it may be polite that the first user stops talking and waits for the other user to finish. This means that the switchover point 17 of switching-off the recording 18 is shifted to the interruption point-in-time 61. Once this occurs, all information/data that ought to be recorded is automatically shifted to the communication terminal 1, represented by region 1D. The recording is stopped and subsequent durations 64, 65, 66 to be recorded are not recorded but transmitted by the first communication terminal 1 upstream as durations 64A, 65A, 66A. Therefore, the not recorded durations 64, 65, 66 will not be replayed in the hastened manner as durations 62B 25, 26. The interruption point-in-time 61 causes that the data reception by the other users ends at point-in-time 63A during replaying. All other information from point-in-time 63A to point-in-time 62A causing the stop of the recording is discarded although the first user has already talked during the duration from point-in-time 63A to 62A. The durations in replaying from point-in-time 63A to point-in-time 62A are displayed in FIG. 6 as durations 64B and 65B, which corresponds in recording to the duration 62. The duration 63 before the lost duration 64B corresponds to the duration 13 recorded before the interruption point-in-time 61. After point-in-time 62A, it is not spoked which is displayed in FIG. 6 by greyed durations 64, 64A, 65, 65A. Since anything said after the interruption point-in-time 61 will be passed for transmission to the first communication terminal 1, these packets/data 66, 66A are also shown in gray.

FIG. 7 illustrates a schematic timeline of the inventive method comprising an interruption point-in-time 71 before the switching point-in-time 17 from passive mode to active mode leading to the switching point-in-time 18 for the recording. In upper region 1E of FIG. 7, the first communication terminal 1 is represented, while the media processing unit 2 is represented in the lower region 2E. The interruption point-in-time 71 may be introduced when the first user talks and unmute has not been detected yet. In this case the switchover point 17 is shifted to the end of the voice activity detection response duration 13 at the point-in-time 18 when the recording is switched-off. This means that information being sent after the detection of voice is lost, shown in FIG. 7 as the duration 72 in black. Therefore, other users such as the second user will only hear what has been said while on mute. The recorded data while on mute has been recorded and is replayed while the first user continues to speak. In this duration shown as a gap 73 and FIG. 7, the first user will in addition to his real-time voice hear his voice as recorded on mute before the recording has been switched-off. Therefore, the first user will know that whatever he said before the interruption is not lost but transmitted to the second user. Then it is up to the users to decide who would continue to talk as it may happen in conferences when two users are trying to talk at the same time.

Instead of a single media processing unit 2, several media processing units may be utilized to carry out the present invention. In this embodiment interrupt triggered by the second user will be indicated from the relevant media processing unit serving the second user.

A technical feature or several technical features which has/have been disclosed with respect to a single or several embodiments discussed herein before, e.g. utilizing several media processing units, may be present also in another embodiment, e.g. the embodiment comprising a real-time active mode and a delayed passive mode displayed in FIG. 3 and FIG. 4, respectively, except it is/they are specified not to be present or it is impossible for it/them to be present for technical reasons.

The invention claimed is:

1. A communication apparatus for controlling a real-time conference session comprising
   a media processing unit communicatively connectable to
      a first communication terminal of a first user and a second communication terminal of a second user, the media processing unit configured to allow a conference session to comprise a passive mode of the first user, wherein the data is received at and transmitted by the first communication terminal as passive data but not received by the second communication terminal, and an active mode of the first user, wherein the data is received and transmitted by the first communication terminal and received by the second communication terminal as active data;
   the communication apparatus configured to perform switching from the passive mode to the active mode at a switching point-in-time, wherein after the switching a first duration of the passive data of the first user, the first duration ending at or starting from the switching point-in-time, is left to be transmitted to the second user;
   the communication apparatus configured to record the first duration of the passive data and a second duration of the active data of the first user, the second duration starting from the switching point-in-time;
   the communication apparatus configured to replay the recorded first duration of the passive data and the recorded second duration of the active data to the second user via the second communication terminal after switching, the replaying starting from the switching point-in-time; and the communication apparatus configured to switch-off of recording and starting to transmit the data of the first user in real-time to the second communication terminal of the second user, when a synchronization delay between a first end of the second duration of the active data of the first user during recording and a second end of the replayed second duration of the active data after recording is equal or smaller than a predetermined duration.

2. The communication apparatus of claim 1, comprising one of the first communication terminal and the second communication terminal.

3. The communication apparatus of claim 1, comprising the first communication terminal and the second communication terminal.

4. The communication apparatus of claim 1, wherein the communication apparatus includes a switch that is configured to perform switching from the passive mode to the active mode.

5. The communication apparatus of claim 1, wherein the communication apparatus includes a switch that is configured to switch-off of recording and starting to transmit the data of the first user in real-time to the second communication terminal of the second user.

6. The communication apparatus of claim 1, comprising a mixing unit, wherein the media processing unit and/or the mixing unit are arranged in a private branch exchange.

7. The communication apparatus of claim 1, wherein the predetermined duration is n times 10 msec, with n being an integer between 1 and 10.

8. The communication apparatus of claim 1 wherein the predetermined duration is defined such that the predetermined duration is not perceived by at least one of the first user and second user.

9. A method of controlling a communication session involving in which a first communication terminal of a first user is communicatively connectable to a second communication terminal of a second user for the communication session, the method comprising:
a media processing unit of a communication apparatus allowing the communication session to comprise a passive mode of the first user, wherein the data is received at and transmitted by the first communication terminal as passive data but not received by the second communication terminal, and an active mode of the first user, wherein the data is received and transmitted by the first communication terminal and received by the second communication terminal as active data;
the communication apparatus switching from the passive mode to the active mode at a switching point-in-time, wherein after the switching a first duration of the passive data of the first user, the first duration ending at or starting from the switching point-in-time, is left to be transmitted to the second user;
recording the first duration of the passive data and a second duration of the active data of the first user, the second duration starting from the switching point-in-time;
replaying the recorded first duration of the passive data and the recorded second duration of the active data to the second user via the second communication terminal after switching, the replaying starting from the switching point-in-time; and
switching off of the recording and starting to transmit the data of the first user in real-time to the second communication terminal of the second user upon a determination that a synchronization delay between a first end of the second duration of the active data of the first user during recording and a second end of the replayed second duration of the active data after recording is equal to or smaller than a predetermined duration.

10. The method of claim 9, wherein the predetermined duration is n times 10 msec, with n being an integer between 1 and 10.

11. The method of claim 9 wherein the predetermined duration is chosen such that the predetermined duration is not perceivable by at least one of the first user and second user.

12. The method of claim 9, wherein the predetermined duration of the synchronization delay is defined as n times 10 msec, wherein n is an integer between 3 and 6.

13. The method of claim 9, wherein a loss of information of the recorded first duration of the passive data and/or the recorded second duration of the active data is introduced during the recording and/or the replaying for achieving hastened replaying.

14. The method of claim 13, wherein the hastened replaying is implemented via dropping or skipping at least one of several speech samples and frames of the recorded first duration of the passive data and/or the recorded second duration of the active data.

15. The method of claim 14, wherein when the first user is interrupted by the second user at a first interruption point-in-time after the recording of the second duration of the active data of the first user has started, the hastened replaying of the recorded first duration of the passive data and the recorded second duration of the active data to the second user ends at the first interruption point-in-time and the switching-off of the recording and starting to transmit the data of the first user in real-time to the second user is shifted to the first interruption point-in-time.

16. The method of claim 9, wherein in the passive mode the first user is muted and does not activate an unmute function for getting switched to the active mode after starting to speak, and wherein the first duration ending at the switching point-in-time and left to be transmitted to the second user comprises a voice activity detection response duration and, upon a determination that the voice activity detection response duration ends, the switching from the passive mode to the active mode is triggered by automatically activating the unmute function.

17. The method of claim 16, wherein at least part of the voice activity detection response duration is utilized as an intentional delay for the communication sessions utilizing Internet Protocol (IP).

18. The method of claim 16 wherein in response to the first user being interrupted by the second user at a second interruption point-in-time that occurs before the recording of the second duration of the active data of the first user has started, the switching-off of the recording and starting to transmit the data of the first user in real-time to the second user is shifted to a point-in-time when the voice activity detection response duration ends and the hastened replaying of the first duration of the passive data ends at the point-in-time when the voice activity detection response duration ends.

19. The method of claim 9, wherein the passive mode is switched to the active mode automatically by an indication recognition unit recognizing an indication and executing the switching from the passive mode to the active mode being in response to recognizing the indication, wherein the indication is at least one of a hand gesture, actuation of on indication button and actuation of an indication indicator via a touchpad.

20. A non-transitory computer readable storage media having instructions stored thereon such that the instructions are executable by a communication apparatus, the instructions defining a method that is performed when the instructions are executed by the communication apparatus for controlling a real-time communication session, the method comprising:

- allowing the communication session to comprise a passive mode of a first user of a first communication terminal that is connected to the second communication terminal for the communication session, wherein the data is received at and transmitted by the first communication terminal as passive data but not received by the second communication terminal during the passive mode;
- allowing the communication session to also include an active mode of the first user, wherein the data is received and transmitted by the first communication terminal and received by the second communication terminal as active data during the active mode;
- switching from the passive mode to the active mode at a switching point-in-time, wherein after the switching a first duration of the passive data of the first user, the first duration ending at or starting from the switching point-in-time, is left to be transmitted to the second user;
- recording the first duration of the passive data and a second duration of the active data of the first user, the second duration starting from the switching point-in-time;
- replaying the recorded first duration of the passive data and the recorded second duration of the active data to the second user via the second communication terminal after switching, the replaying starting from the switching point-in-time; and
- switching off of the recording and starting to transmit the data of the first user in real-time to the second communication terminal of the second user upon a determination that a synchronization delay between a first end of the second duration of the active data of the first user during recording and a second end of the replayed second duration of the active data after recording is equal or smaller than a predetermined duration.

* * * * *